US012278024B2

(12) United States Patent
Sashi et al.

(10) Patent No.: US 12,278,024 B2
(45) Date of Patent: Apr. 15, 2025

(54) METHOD OF MAKING AN ELECTRICAL STEEL SHEET PROVIDED WITH INSULATING COATING

(71) Applicant: JFE Steel Corporation, Tokyo (JP)

(72) Inventors: Kazumichi Sashi, Chiba (JP); Nobuko Nakagawa, Chiba (JP); Naoki Muramatsu, Chiba (JP); Chiyoko Tada, Chiba (JP); Nobue Fujibayashi, Chiba (JP)

(73) Assignee: JFE Steel Corporation, Tokyo (JP)

(*) Notice: Subject to any disclaimer, the term of this patent is extended or adjusted under 35 U.S.C. 154(b) by 695 days.

(21) Appl. No.: 17/493,900

(22) Filed: Oct. 5, 2021

(65) Prior Publication Data

US 2022/0028576 A1 Jan. 27, 2022

Related U.S. Application Data

(62) Division of application No. 16/517,760, filed on Jul. 22, 2019, now Pat. No. 11,177,052, which is a (Continued)

(30) Foreign Application Priority Data

Nov. 28, 2013 (JP) ................................ 2013-246473
Jun. 30, 2014 (JP) ................................ 2014-133514

(51) Int. Cl.
*C21D 8/12* (2006.01)
*C22C 38/00* (2006.01)
(Continued)

(52) U.S. Cl.
CPC ............ *H01B 7/02* (2013.01); *C21D 8/1283* (2013.01); *C22C 38/00* (2013.01); *C22C 38/06* (2013.01); *H01B 3/10* (2013.01); *H01F 1/18* (2013.01)

(58) Field of Classification Search
CPC ....... C21D 8/1283; C22C 38/00; C22C 38/02; C22C 38/06; H01B 3/10; H01B 7/02; H01F 1/14783
See application file for complete search history.

(56) References Cited

U.S. PATENT DOCUMENTS 4,120,702 A * 10/1978 Akerblom .............. C23C 22/20 427/104
5,507,883 A 4/1996 Tanaka et al.
(Continued)

FOREIGN PATENT DOCUMENTS

CN 1934289 3/2007
CN 101790599 7/2010
(Continued)

OTHER PUBLICATIONS

Office Action dated Oct. 9, 2017, of corresponding Chinese Application No. 201480065155.1, along with an English translation of the Patent Search Report.
(Continued)

*Primary Examiner* — Humera N. Sheikh
*Assistant Examiner* — Kevin CT Li
(74) *Attorney, Agent, or Firm* — DLA Piper LLP (US)

(57) ABSTRACT

An electrical steel sheet provided with an insulating coating wherein the insulating coating is formed by a method includes forming an insulating coating on an electrical steel sheet, including: preparing a treatment solution that does not contain an Fe compound by adding an Si compound to water; applying the treatment solution to a surface of the electrical steel sheet; leaving the treatment solution on the surface of the electrical steel sheet to allow Fe in the electrical steel sheet to be dissolved in the treatment solution; and baking the treatment solution to form the insulating film such that a coating weight of Si in the insulating coating in terms of $SiO_2$ is 50% to 99% of the total coating weight,
(Continued)

and a ratio (Fe/Si) of content of Fe to content of Si in the insulating coating is 0.01 to 0.6 on a molar basis.

17 Claims, 1 Drawing Sheet

Related U.S. Application Data division of application No. 15/039,161, filed as application No. PCT/JP2014/005661 on Nov. 11, 2014, now Pat. No. 10,403,417.

(51) Int. Cl.

| | |
|---|---|
| ***C22C 38/06*** | (2006.01) |
| ***H01B 3/10*** | (2006.01) |
| ***H01B 7/02*** | (2006.01) |
| ***H01F 1/18*** | (2006.01) |

(56) References Cited

U.S. PATENT DOCUMENTS

| | | | | |
|---|---|---|---|---|
| 6,638,633 | B1 | 10/2003 | Komori et al. | |
| 2004/0026667 | A1 | 2/2004 | Izaki et al. | |
| 2007/0188289 | A1* | 8/2007 | Kumano | C23C 18/02 336/219 |
| 2012/0301744 | A1* | 11/2012 | Sashi | C21D 8/1283 428/626 |
| 2012/0328871 | A1 | 12/2012 | Rout et al. | |

FOREIGN PATENT DOCUMENTS

| | | |
|---|---|---|
| CN | 103025917 | 4/2013 |
| EP | 2 186 924 | 5/2010 |
| EP | 2 597 177 | 5/2013 |
| JP | 59-041480 | 3/1984 |
| JP | 59-85872 | 5/1984 |
| JP | 62-050483 | 3/1987 |
| JP | 10-046350 | 2/1998 |
| JP | 10-130858 | 5/1998 |
| JP | 2944849 | 6/1999 |
| JP | 2002-047576 | 2/2002 |
| JP | 2002-235118 | 8/2002 |
| JP | 2003-193263 | 7/2003 |
| JP | 2004-285481 | 10/2004 |
| JP | 3604306 | 12/2004 |
| JP | 2005-240131 | 9/2005 |
| JP | 2005-268630 | 9/2005 |
| JP | 3718638 | 9/2005 |
| JP | 2007-023329 | 2/2007 |
| JP | 2007-197820 | 8/2007 |
| JP | 2008-240080 | 10/2008 |
| JP | 2010-140968 | 6/2010 |
| JP | 2013-245395 | 12/2013 |
| KR | 100567041 | 4/2006 |
| WO | 2013/031200 | 3/2013 |

OTHER PUBLICATIONS

Korean Notice of Allowance dated Oct. 12, 2017, of corresponding Korean Application No. 10-2016-7016934, along with an English translation.

Office Action dated Mar. 31, 2017, of corresponding Korean Application No. 10-2016-7016934, along with a Concise Statement of Relevance of Office Action in English.

Supplementary European Search Report dated Dec. 7, 2016, of corresponding European Application No. 14866336.2.

Chinese Office Action dated Apr. 26, 2017, of corresponding Chinese Application No. 201480065155.1, along with a Search Report in English.

Taiwanese Office Action dated Mar. 22, 2016, of corresponding Taiwanese Application No. 103141109, along with a Search Report in English.

Office Action dated Feb. 20, 2020 of counterpart European Application No. 14866336.2.

* cited by examiner

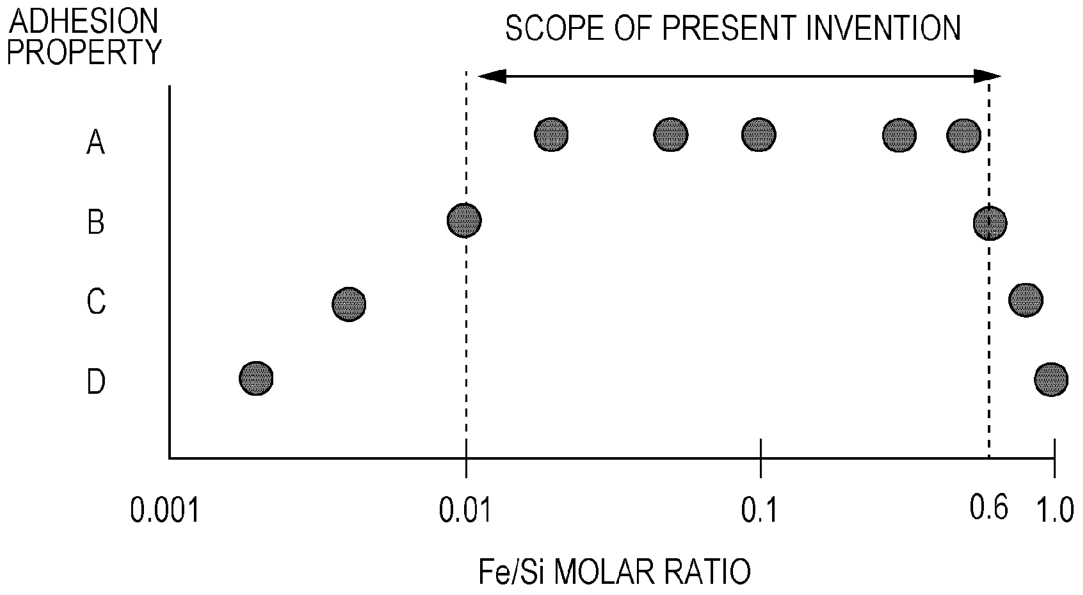
ADHESION PROPERTY
SCOPE OF PRESENT INVENTION
A
B
C
D
0.001
0.01
0.1
0.6
1.0
Fe/Si MOLAR RATIO

METHOD OF MAKING AN ELECTRICAL STEEL SHEET PROVIDED WITH INSULATING COATING

RELATED APPLICATIONS

This is a divisional of U.S. Ser. No. 16/517,760, filed Jul. 22, 2019, which is a divisional of U.S. Ser. No. 15/039,161, filed May 25, 2016 (now U.S. Pat. No. 10,403,417, issued Sep. 3, 2019), which is a § 371 of International Application No. PCT/JP014/005661, with an international filing date of Nov. 11, 2014, which is based on Japanese Patent Application No. 2014-133514, filed Jun. 30, 2014, the subject matter of which is incorporated by reference.

TECHNICAL FIELD

This disclosure relates to an electrical steel sheet provided with insulating coating which is excellent in punchability and adhesion property even without containing chromium compound.

BACKGROUND

Electrical steel sheets are used in motors, transformers and the like. An insulating coating formed on the electrical steel sheet is required to have various properties such as interlaminar resistance, ease of processing and forming, and stability during storage and usage. In particular, an insulating coating excellent in punchability can reduce the number of times a die used for punching is replaced. An insulating coating excellent in adhesion property reduces the frequency of cleaning due to coating delamination. Therefore, such an insulating coating is easy to handle and excellent in convenience. Properties required for the insulating coating formed on the electrical steel sheet depend on applications. Therefore, various insulating coatings are under development depending on applications.

When an electrical steel sheet is used to manufacture a product, the electrical steel sheet is usually punched, sheared or bent. Working the electrical steel sheet thus may possibly deteriorate magnetic properties thereof by residual strain. Stress relief annealing is often performed at a temperature of about 700° C. to 800° C. to ameliorate the deterioration of the magnetic properties. Thus, in performing stress relief annealing, an insulating coating needs to have heat resistance sufficient to withstand heat during stress relief annealing.

Insulating coatings formed on electrical steel sheets can be categorized into three types below:

(1) An inorganic coating that withstands stress relief annealing with a focus on weldability and heat resistance.

(2) A resin-containing inorganic coating (that is, a coating which has inorganic with some organic materials) that withstands stress relief annealing to achieve both weldability and heat resistance.

(3) An organic coating incapable of withstanding stress relief annealing for special applications.

General-purpose insulating coatings capable of withstanding heat during stress relief annealing are those containing an inorganic component as described in Types (1) and (2). The inorganic component used often includes a chromium compound. An example of a Type (2) insulating coating that contains the chromium compound is a chromate insulating coating.

A Type (2) chromate insulating coating is formed by one-coating-one-baking. The Type (2) chromate insulating coating can remarkably enhance the punchability of an electrical steel sheet provided with insulating coating and therefore is more widely used as compared to a Type (1) inorganic coating.

For example, Japanese Examined Patent Application Publication No. 60-36476 discloses an electric iron plate having an electrically insulating coating obtained such that a treatment solution is applied to a surface of a base electrical steel sheet and then baked by a common method, the treatment solution being obtained such that a resin emulsion having a vinyl acetate/VeoVa ratio of 90/10 to 40/60 as an organic resin and an organic reducing agent are blended with an aqueous solution of a dichromate containing at least one divalent metal in proportions of 5 parts to 120 parts by weight of resin solid matter in the resin emulsion and 10 parts to 60 parts by weight of the organic reducing agent to 100 parts by weight of $CrO_3$ in the aqueous solution.

However, in recent years, electrical steel sheets with an insulating coating containing no chromium compound have been demanded in the field of electrical steel sheets because of rising environmental awareness.

Therefore, an electrical steel sheet with an insulating coating containing no chromium compound has been developed. For example, Japanese Unexamined Patent Application Publication No. 10-130858 discloses an insulating coating that contains no chromium compound and can improve punchability. The insulating coating disclosed in JP '858 contains resin and colloidal silica (alumina-containing silica). Japanese Unexamined Patent Application Publication No. 10-46350 discloses an insulating coating made of one or more of colloidal silica, alumina sol, and zirconia sol that contains a water-soluble or emulsion resin. Japanese Patent No. 2944849 discloses an insulating coating free from a chromium compound that contains a phosphate as a major component and contains resin.

However, electrical steel sheets with an insulating coating containing no chromium compound may be inferior in punchability and adhesion property (adhesion between an insulating coating and an electrical steel sheet) to an insulating coating containing a chromium compound.

On the other hand, for example, Japanese Patent No. 3718638 discloses a method of improving adhesion property by suppressing the amount of Fe in the coating of a polyvalent metal phosphate to satisfy $0 \leq Fe/P \leq 0.10$. Furthermore, Japanese Unexamined Patent Application Publication No. 2005-240131 discloses a method of improving properties of an insulating coating by suppressing dissolution of Fe into the coating solution, though no particular values are specified therein.

In general, properties of an insulating coating probably tend to be deteriorated by dissolution of Fe into the insulating coating as suggested above. However, in a coating formed such that a paint containing no chromium compound, where chromium compound produces a passivation effect, is directly applied to a surface of an electrical steel sheet and then baked, it is difficult to control the dissolution of Fe. As a result, it is difficult to sufficiently enhance the performance of the insulating coating, particularly, for example, the punchability and adhesion property thereof.

Japanese Unexamined Patent Application Publication Nos. 2003-193263 and 2004-285481 disclose a method of preparing an iron core having end insulation properties at low temperature in a short time. In the method, formation of a siloxane bond network is accelerated by introducing a metal or metalloid selected from the group consisting of Fe, Li, Na, K, Mg, Ca, Cr, Mn, Co, Ni, Cu, Zn, Y, Ti, Zr, Nb, B, Al, Ge, Sn, P, Sb, and Bi into an insulating coating in the form of an alkoxide or a chloride. However, JP '263 and JP '481 do not describe how to accelerate formation of the siloxane bond network in detail in an example or do not describe the particular possibility of improving punchability, adhesion property and the like.

It could therefore be helpful to provide an electrical steel sheet provided with insulating coating excellent in punchability and adhesion property.

SUMMARY

We have unexpectedly found that, among insulating coatings containing Si derived from a Si compound and which is one of main inorganic components, one containing a specific amount of Fe has enhanced coating properties. We thus provide:

(1) An electrical steel sheet provided with insulating coating comprises an electrical steel sheet and an insulating coating formed on the electrical steel sheet. The insulating coating contains Si and Fe. The coating weight of Si in the insulating coating in terms of $SiO_2$ is 50% to 99% of the total coating weight. The ratio (Fe/Si) of the content of Fe to the content of Si in the insulating coating ranges from 0.01 to 0.6 on a molar basis.

(2) In the electrical steel sheet provided with insulating coating specified in Item (1), the insulating coating contains an organic resin and/or a lubricant and, in the insulating coating, the ratio (C (the organic resin+the lubricant)/($Fe_2O_3$+$SiO_2$)) of the coating weight of the organic resin and/or the lubricant in terms of C to the sum of the coating weight of Fe in terms of $Fe_2O_3$ and the coating weight of Si in terms of $SiO_2$ ranges from 0.05 to 0.8.

An electrical steel sheet provided with insulating coating is excellent in punchability and is also excellent in adhesion between an insulating coating and an electrical steel sheet.

We also provide an electrical steel sheet provided with an insulating coating wherein the insulating coating is formed by a method including:

- forming an insulating coating on an electrical steel sheet, including: preparing a treatment solution that does not contain an Fe compound by adding an Si compound to water;
- applying the treatment solution to a surface of the electrical steel sheet;
- leaving the treatment solution on the surface of the electrical steel sheet to allow Fe in the electrical steel sheet to be dissolved in the treatment solution; and
- baking the treatment solution to form the insulating film such that a coating weight of Si in the insulating coating in terms of $SiO_2$ is 50% to 99% of the total coating weight, and a ratio (Fe/Si) of content of Fe to content of Si in the insulating coating is 0.01 to 0.6 on a molar basis.

We further provide an electrical steel sheet provided with an insulating coating formed by a method including:

- forming an insulating coating on an electrical steel sheet, including: preparing a treatment solution that does not contain an Fe compound by adding an Si compound that contains a reactive functional group to water;
- applying the treatment solution to a surface of the electrical steel sheet;
- leaving the treatment solution on the surface of the electrical steel sheet to allow Fe in the electrical steel sheet to be dissolved in the treatment solution; and
- baking the treatment solution to form the insulating film such that a coating weight of Si in the insulating coating in terms of $SiO_2$ is 50% to 99% of the total coating weight, and a ratio (Fe/Si) of content of Fe to content of Si in the insulating coating is 0.01 to 0.6 on a molar basis.

BRIEF DESCRIPTION OF THE DRAWING

The Drawing is a graph showing the influence of the molar ratio (Fe/Si) in insulating coating on the adhesion property.

DETAILED DESCRIPTION

Our steel sheets are described below. This disclosure is not limited to the described examples.

Our electrical steel sheet provided with an insulating coating includes an electrical steel sheet and an insulating coating formed on the electrical steel sheet. The electrical steel sheet and the insulating coating are described below in that order.

Electrical Steel Sheet

The electrical steel sheet is not limited to a specific electrical steel sheet. The electrical steel sheet used may be, for example, an electrical steel sheet with a general composition. In general, components contained in the electrical steel sheet are Si, Al, and the like. The remainder of the electrical steel sheet are Fe and inevitable impurities. Typically, the content of Si is 0.05% to 7.0% by mass and the content of Al is 2.0% by mass or less.

The type of the electrical steel sheet is not particularly limited. The following sheets can be preferably used: a so-called soft iron plate (electric iron plate) with high magnetic flux density, a general cold-rolled steel sheet such as SPCC, a non-oriented electrical steel sheet containing Si and Al to increase resistivity and the like. A non-oriented electrical steel sheet based on JIS C 2552:2000 and a grain-oriented electrical steel sheet based on JIS C 2553:2012 can be preferably used.

Insulating Coating

The insulating coating contains Si and Fe. The insulating coating may contain an arbitrary component such as an organic resin. Components contained in the insulating coating are described below.

The insulating coating, which contains Si, can be formed using a Si compound. Examples of the Si compound include colloidal silica, fumed silica, alkoxysilanes, and siloxanes. Using one or more selected from these compounds enables the insulating coating to contain Si.

The Si compound used to form the insulating coating is preferably a Si compound containing a reactive functional group. Using the Si compound containing the reactive functional group probably allows a strong insulating coating to be formed, whereby the adhesion property and punchability are significantly improved. The following groups can be cited as examples of the reactive functional group: an addition-reactive group, a condensation-reactive group, a ring opening-reactive group, and a radically reactive group. Specific examples of the reactive functional group include silicon atom-bonded hydrogen atoms, alkenyl groups (such as a vinyl group, an allyl group, and a propenyl group), mercapto group-containing organic groups, alkoxy groups (such as a methoxy group, an ethoxy group, and a propoxy group) each bonded to a silicon atom, hydroxy groups each bonded to a silicon atom, halogen atoms each bonded to a silicon atom, amino group-containing organic groups (such as a 2-aminoethyl group and a 3-aminopropyl group), epoxy group-containing organic groups (glycidoxyalkyl groups (such as a 3-glycidoxypropyl group)), epoxycyclohexylalkyl groups (such as a 2-(3,4-epoxycyclohexyl)ethyl group), acryl-containing organic groups (such as a 3-acryloxypropyl group), and methacryl-containing organic groups (such as a 3-methacryloxypropyl group).

Among Si compounds containing a reactive functional group, a Si compound containing an epoxy group-containing organic group, an amino group-containing organic group or an alkoxy group bonded to a silicon atom is preferably used from the viewpoint of further enhancing the desired effect.

Further, a Si compound containing two or more types of reactive functional groups bonded to a single Si compound is preferably used. Examples of such a Si compound include Si compounds such as 3-glycidoxypropyltrimethoxysilane and 3-glycidoxypropylmethyldimethoxy-silane, containing an epoxy group-containing organic group and alkoxy groups bonded to a silicon atom and Si compounds such as 3-aminopropyltrimethoxysilane and N-2-(aminoethyl)-3-aminopropyltrimethoxysilane, containing an amino group-containing organic group and alkoxy groups bonded to a silicon atom.

Further, two or more types of Si compounds containing different reactive functional groups are preferably used. The following combinations can be cited: for example, a combination of a Si compound containing an amino group-containing organic group and a Si compound containing an epoxy group-containing organic group (for example, a combination of 3-glycidoxypropyltrimethoxysilane and 3-aminopropyltrimethoxysilane, a combination of 3-glycidoxypropyltrimethoxysilane and N-2-(aminoethyl)-3-aminopropyltrimethoxysilane, or the like) and a combination of a Si compound containing an alkoxy group bonded to a silicon atom and a Si compound containing an epoxy group-containing organic group (for example, a combination of 3-glycidoxypropyltrimethoxysilane and methyltriethoxysilane, a combination of 3-glycidoxypropylmethyldimethoxysilane and methyltriethoxysilane or the like).

When using the two or more types of Si compounds containing the different reactive functional groups, the ratio between the Si compounds used is not particularly limited and may be appropriately set. When using, for example, the combination of the Si compound containing the amino group-containing organic group and the Si compound containing the epoxy group-containing organic group, the mass ratio (the Si compound containing the amino group-containing organic group/the Si compound containing the epoxy group-containing organic group) between the Si compounds used as raw materials is preferably 0.25 to 4.0. When (the Si compound containing the amino group-containing organic group/the Si compound containing the epoxy group-containing organic group) is 0.25 to 4.0, the effect of enhancing corrosion resistance is obtained. Alternatively, when using the combination of the Si compound containing the alkoxy group bonded to the silicon atom and the Si compound containing the epoxy group-containing organic group, the mass ratio (the Si compound containing the alkoxy group bonded to the silicon atom/the Si compound containing the epoxy group-containing organic group) between the Si compounds, which are used as raw materials, is preferably 0.20 to 3.0. When (the Si compound containing the alkoxy group bonded to the silicon atom/the Si compound containing the epoxy group-containing organic group) is 0.20 to 3.0, the effect of enhancing steam exposure resistance is obtained.

Further, the Si compound containing the reactive functional group is preferably used in combination with colloidal silica and/or fumed silica. In this combination, the mass ratio ((colloidal silica+fumed silica)/the Si compound) of the total amount of the Si compound containing the reactive functional group to the amount of the colloidal silica and/or fumed silica used is preferably 2.0 or less. When the mass ratio ((colloidal silica+fumed silica)/the Si compound) is 2.0 or less, the effect of enhancing scratch resistance is obtained.

The content of Si in the insulating coating is adjusted such that the coating weight of Si (hereinafter referred to as the Si coating weight in some instances) in terms of $SiO_2$ is 50% to 99% of the total coating weight. Herein, the unit "%" refers to "mass percent." When the Si coating weight is less than 50% of the total coating weight, an adhesion property is not improved and interlaminar resistance is not obtained after annealing. When the Si coating weight is greater than 99% of the total coating weight, the adhesion property and appearance are deteriorated. The term "coating weight" refers to the mass of a dry coating. The coating weight can be determined from dry residual matter (solid matter) obtained by drying a treatment solution to form a coating on a steel sheet at 180° C. for 30 minutes. The term "total coating weight" refers to the actual mass of the dry insulating coating (dry coating).

The insulating coating contains Fe. The insulating coating containing Fe can be formed using an Fe compound (a compound that gives off Fe ions or Fe colloid in a treatment solution to form the insulating coating). Alternatively, the insulating coating containing Fe may be formed such that Fe is dissolved from the electrical steel sheet during formation of the insulating coating. Examples of the Fe compound include iron acetate, iron citrate, and ammonium ferric citrate.

The amount of dissolved Fe can be adjusted depending on a steel component of the electrical steel sheet; the pH of the treatment solution used to form the insulating coating; the time elapsed until the treatment solution applied to the electrical steel sheet is baked; or the like. In particular, as the content of Al in the electrical steel sheet is higher, the amount of dissolved Fe tends to be smaller. As the content of Si in the electrical steel sheet is higher, the amount of dissolved Fe tends to be larger. As the pH of the treatment solution is lower, the amount of dissolved Fe tends to be larger. As the time elapsed until the treatment solution applied to the electrical steel sheet is baked is longer, the amount of dissolved Fe tends to be larger. Increasing the amount of dissolved Fe by adjusting these factors enables the amount of Fe contained in the insulating coating to be increased. Reducing the amount of dissolved Fe by adjusting these factors enables the amount of Fe contained in the insulating coating to be reduced.

The content of Fe in the insulating coating needs to be adjusted such that the ratio (Fe/Si) of the amount of Fe to the amount of Si in the insulating coating is 0.01 to 0.6 on a molar basis. The reason why coating properties are enhanced when the ratio (Fe/Si) is within the above range is unclear and probably because reactivity of the Si compound with Fe is high. That is, Si and Fe are probably bonded to each other with O therebetween to form an excellent insulating coating. When the ratio (Fe/Si) is extremely low, a reaction proceeding between the insulating coating and a surface of the electrical steel sheet is probably insufficient and therefore the adhesion property is insufficient. When the ratio (Fe/Si) is high, the amount of Fe in the insulating coating is large and the formation of a bond between Si and Fe (Si—O—Fe—O—Si or the like) is probably inhibited. Hence, the adhesion property and punchability are deteriorated. The ratio (Fe/Si) is preferably 0.01 to 0.60, more preferably 0.02 to 0.5, and most preferably 0.02 to 0.50.

How to determine the ratio (Fe/Si) is not particularly limited if the desired effect can be confirmed. The ratio (Fe/Si) can be determined by, for example, Auger electron spectroscopy, depth-wise analysis by X-ray photoelectron spectroscopy, the EDS analysis of the coating by cross-sectional TEM, or dissolution of the coating in hot alkali. In Auger electron spectroscopy, the ratio (Fe/Si) can be determined such that depth-wise analysis is performed with sputtering performed and the average value of each of Fe and Si is determined until the intensity of Si decreases by half. In this operation, the number of analyzed spots is preferably ten or more. In the dissolution of the coating in hot alkali, the ratio (Fe/Si) can be determined such that, for example, a coating-equipped steel sheet is immersed in a heated 20 mass percent aqueous solution of NaOH, a coating is dissolved therein (hot alkali dissolution), and Fe and Si in the aqueous solution are subjected to ICP analysis.

The insulating coating may contain an organic resin. Allowing the insulating coating to contain the organic resin enables properties of the insulating coating to be further enhanced. The organic resin is not particularly limited and any known one conventionally used is advantageously suitable. Examples of the organic resin include aqueous resins (emulsion, dispersion, water-soluble) such as an acrylic resin, an alkyd resin, a polyolefin resin, a styrene resin, a vinyl acetate resin, an epoxy resin, a phenol resin, a polyester resin, a urethane resin, and a melamine resin. In particular, an emulsion of an acrylic resin or an ethylene-acrylic acid resin is preferable.

The organic resin effectively contributes to improvements in scratch resistance and punchability and the content thereof is not particularly limited. The content of the organic resin in the insulating coating is preferably adjusted such that the ratio (C (the organic resin)/($Fe_2O_3$+$SiO_2$)) of the coating weight of the organic resin in terms of C to the sum of the coating weight of Fe in terms of $Fe_2O_3$ and the coating weight of Si in terms of $SiO_2$ is 0.05 to 0.8. Herein, the coating weight is given in mass percent. When (C (the organic resin)/($Fe_2O_3$+$SiO_2$)) is 0.05 or more, the effect of enhancing punchability is obtained. When (C (the organic resin)/($Fe_2O_3$+$SiO_2$)) is 0.8 or less, scratch resistance is ensured.

The insulating coating may contain a lubricant. The effect of enhancing scratch resistance and punchability is obtained by allowing the insulating coating to contain the lubricant.

The lubricant used may be, for example, one or more of polyolefin waxes (for example, polyethylene waxes), paraffin waxes (for example, synthetic paraffin, natural paraffin, and the like), fluorocarbon waxes (for example, polytetrafluoroethylene and the like), fatty acid amide compounds (for example, stearamide, palmitamide and the like), metal soaps (for example, calcium stearate, zinc stearate and the like), metal sulfides (for example, molybdenum disulfide, tungsten disulfide and the like), graphite, graphite fluoride, boron nitride, polyalkylene glycols, and alkali metal sulfates and the like. In particular, a polyethylene wax and a PTFE (polytetrafluoroethylene) wax are preferable.

The amount of the lubricant is not particularly limited and preferably adjusted such that the ratio (C (the lubricant)/($Fe_2O_3$+$SiO_2$)) of the coating weight of the lubricant in terms of C to the sum of the coating weight of Fe in terms of $Fe_2O_3$ and the coating weight of Si in terms of $SiO_2$ is 0.05 to 0.8. The ratio thereof more preferably is 0.05 to 0.3. When the ratio of the coating weight is 0.05 or more, the effect of reducing the friction with a punching die is obtained, which is therefore preferable. The ratio is preferably 0.8 or less because the coating is not peeled off during slitting.

The insulating coating may contain both the organic resin and the lubricant. In this example, the content of the organic resin and lubricant in the insulating coating is preferably adjusted such that the ratio (C (the organic resin+the lubricant)/($Fe_2O_3$+$SiO_2$)) of the sum of the coating weight of the organic resin in terms of C and the coating weight of the lubricant in terms of C to the sum of the coating weight of Fe in terms of $Fe_2O_3$ and the coating weight of Si in terms of $SiO_2$ is 0.05 to 0.8. When the ratio thereof is within this range, the effects due to the organic resin and the lubricant are obtained.

The insulating coating may further contain another component such as a surfactant, a rust preventive, an oxidation inhibitor, an additive usually used, an inorganic compound, or an organic compound in addition to the above components. Examples of the inorganic compound include boric acid and pigments.

Above other component may be contained in the insulating coating such that the desired effect is not impaired. For example, the content of the other component is preferably adjusted such that the ratio (the other component/($Fe_2O_3$+$SiO_2$)) of the coating weight of the other component to the sum of the coating weight of Fe in terms of $Fe_2O_3$ and the coating weight of Si in terms of $SiO_2$ is 0.8 or less. When (the other component/($Fe_2O_3$+$SiO_2$)) is 0.8 or less, scratch resistance is ensured.

The thickness of the insulating coating, which contains the above components, is not particularly limited and may be set depending on properties required for the insulating coating. In an insulating coating of a typical electrical steel sheet provided with insulating coating, the insulating coating has a thickness of 0.01 μm to 10 μm. The thickness of the insulating coating is preferably 0.05 μm to 1 μm.

A method of manufacturing the electrical steel sheet provided with insulating coating is described below.

The electrical steel sheet may be a common one as described above. Thus, the electrical steel sheet may be one manufactured by a common method or a commercially available one.

Pretreatment of the electrical steel sheet, which is a raw material, is not particularly limited. That is, the electrical steel sheet may be untreated. It is advantageous that the electrical steel sheet is degreased with alkali or is pickled with hydrochloric acid, sulfuric acid, phosphoric acid, or the like.

The treatment solution used to form the insulating coating is prepared. The treatment solution can be prepared by adding, for example, the Si compound to deionized water. The treatment solution may be prepared by adding the Fe compound, the organic resin, the lubricant, and/or another compound to deionized water as required.

The pH of the treatment solution may be adjusted when the treatment solution is prepared. The pH of the treatment solution is one of factors affecting the amount of Fe in the insulating coating as described above. Thus, from the viewpoint of the desired amount of Fe, the pH of the treatment solution is preferably adjusted together with the elapsed time (the time elapsed until the treatment solution applied to the electrical steel sheet is baked), the composition of the electrical steel sheet or the like. When adjusting the pH of the treatment solution, the pH of the treatment solution is preferably adjusted to 3 to 12. The pH of the treatment solution is preferably 3 or more because the amount of Fe in the coating is unlikely to be excessive. The pH of the treatment solution is preferably 12 or less because the amount of Fe in the coating is unlikely to be short.

Next, the treatment solution is applied to a surface of the electrical steel sheet and left for a certain time. The elapsed time is one of the factors affecting the amount of Fe in the insulating coating as described above. In particular, leaving the treatment solution for a certain time allows Fe in the electrical steel sheet to be dissolved in the treatment solution. This enables the insulating coating to contain Fe. Thus, from the viewpoint of the desired amount of Fe, the elapsed time is preferably adjusted together with the pH of the treatment solution, the composition of the electrical steel sheet, the temperature of an atmosphere in which the treatment solution is left (room temperature of, for example, 10° C. to 30° C.) or the like. When adjusting the elapsed time, the elapsed time is preferably adjusted to 3 seconds to 220 seconds and more preferably 10 seconds to 100 seconds.

A process of applying the treatment solution to the electrical steel sheet is not particularly limited. Various tools such as a roll coater, a flow coater, a spray, and a knife coater can be used to apply the treatment solution to the electrical steel sheet.

Next, the treatment solution applied to the electrical steel sheet is baked to form an insulating coating. A process of baking the treatment solution is not particularly limited. Hot-air heating, infrared heating, induction heating and the like usually used can be used. The baking temperature of the treatment solution is not particularly limited and may be set such that the temperature of the steel sheet reaches about 150° C. to 350° C. The baking time thereof is not particularly limited and may be selected from, for example, 1 second to 10 minutes.

The electrical steel sheet provided with an insulating coating can be relieved of the strain due to, for example, punching by stress relief annealing. A preferable atmosphere for stress relief annealing is an atmosphere such as an $N_2$ atmosphere or a DX gas atmosphere, unlikely to oxidize iron. Corrosion resistance can be enhanced such that the dew point Dp is set to an elevated temperature, for example, about 5° C. to 60° C. and a surface and a cut end surface are slightly oxidized. The temperature of stress relief annealing is preferably 700° C. to 900° C. and more preferably 700° C. to 800° C. The holding time at a stress relief annealing temperature is preferably long and more preferably 1 hour or more.

The insulating coating is preferably placed on both surfaces of the steel sheet and may be placed on a single surface thereof depending on purposes. Alternatively, the insulating coating may be placed on a single surface thereof and another insulating coating may be placed on another surface thereof.

EXAMPLES

As shown in Table 1, treatment solutions were prepared such that Si compounds were added to deionized water together with organic resins, Fe compounds, or lubricants as required. The pH of each treatment solution was as shown in Table 1. In Table 1, the amount of each component is given in parts by mass per 100 parts by mass of all effective components excluding water and a solvent. The total concentration of solid matter of the components with respect to the amount of deionized water was 50 g/l. In Table 1, S1 to S7 representing the Si compounds are as shown in Table 2, R1 to R3 representing the organic resins are as shown in Table 3, F1 and F2 representing the Fe compounds are as shown in Table 4, and L1 and L2 representing the lubricants are as shown in Table 5.

Each treatment solution was applied to a surface (single surface) of a specimen, cut out of an electrical steel sheet (A360 (JIS C 2552 (2000)) having a thickness of 0.35 mm, having a width of 150 mm and a length of 300 mm using a roll coater; left for a time (time elapsed after application until baking) shown in Table 1; and then baked in a hot-air baking oven at a baking temperature (i.e., temperature to which the steel sheet was heated) shown in Table 1 for a baking time shown in Table 1, followed by cooling to room temperature, whereby an insulating coating was formed.

The coating weight of Si in the insulating coating in terms of $SiO_2$, the coating weight of Fe in the insulating coating in terms of $Fe_2O_3$, and the coating weight of each organic resin or lubricant in the insulating coating in terms of C were measured such that the insulating coating was heated and dissolved in a heated 20 mass percent aqueous solution of NaOH and Fe, Si, and C in the aqueous solution were subjected to ICP analysis. The following items were shown in Table 1: the amount of Si (the coating weight in terms of $SiO_2$), the amount of Fe (the coating weight in terms of $Fe_2O_3$), the molar ratio (Fe/Si) of Fe to Si, the ratio between the coating weights (the coating weight of the organic resin in terms of C: C (the organic resin)/($Fe_2O_3$+$SiO_2$)), the ratio between the coating weights (the coating weight of the lubricant in terms of C: C (the lubricant)/($Fe_2O_3$+$SiO_2$)), and the proportion (Si content in Table 1) of the amount of Si to all the coating weight.

Results obtained by investigating coating properties (punchability and adhesion property) of obtained electrical steel sheets provided with insulating coating are shown in Table 1 (product sheets in Table 1). Only some of the electrical steel sheets provided with insulating coating were evaluated for punchability.

Annealed sheets obtained by subjecting the electrical steel sheets provided with insulating coating to stress relief annealing at 750° C. for 2 hours in a nitrogen atmosphere were also evaluated for coating properties. Evaluation results are shown in Table 1 (annealed sheets in Table 1).

A particular method of evaluating each of punchability and adhesion property and evaluation standards for punchability and adhesion property were as described below.

Punchability

Each electrical steel sheet provided with insulating coating was punched using a steel die with a diameter of 15 mm until the height of a burr reached 50 μm. The punchability was evaluated on the basis of the number of times the electrical steel sheet provided with insulating coating was punched. Evaluation standards were as described below. Evaluation results were shown in Table 1.

Judgement Standards

A: 1,200,000 times or more
B: 1,000,000 times to less than 1,200,000 times
C: 700,000 times to less than 1,000,000 times
D: 300,000 times to less than 700,000 times
E: less than 300,000 times Adhesion Property An adhesive cellophane tape was stuck on the surface of each electrical steel sheet provided with insulating coating. After the electrical steel sheet provided with insulating coating was bent inward to a radius of 10 mm, the adhesive cellophane tape was peeled off and the residual state of the coating on the steel sheet was evaluated by visual observation. Evaluation standards were as described below. Evaluation results were shown in Table 1. The relationship between the molar ratio (Fe/Si) and adhesion property measured in Comparative Examples 1 to 4 and Examples 1 to 7 is shown in FIG. 1.

Judgement Standards

A: a residual rate of 90% or more
B: a residual rate of 60% or more to less than 90%
C: a residual rate of 30% or more to less than 60%
D: a residual rate of less than 30%

As shown in Table 1, every electrical steel sheet provided with our insulating coating obtained was excellent in punchability and adhesion property.

TABLE 1

| | Insulating coating | | | | | | | | | | | | | | | |
|---|---|---|---|---|---|---|---|---|---|---|---|---|---|---|---|---|
| | Inorganic component | | | | | | | | | | | Organic resin | | Lubricant | | |
| | Si compound added to treatment solution | | | | | | | | | | | | | | | |
| No. | S1 Parts by mass | S2 Parts by mass | S3 Parts by mass | S4 Parts by mass | S5 Parts by mass | S6 Parts by mass | S7 Parts by mass | Amount of Si in insulating coating (in terms of $SiO_2$) $g/m^2$ | Fe compound added to treatment solution | Amount of Fe in insulating coating (in terms of $Fe_2O_3$) $g/m^2$ | Molar ratio of Fe to Si in insulating coating | Organic resin added to treatment solution | (C (organic resin)/(FeO + $SiO_2$)) Ratio between coating weights | Lubricant added to treatment solution | (C (organic resin)/($Fe_2O_3$ + $SiO_2$)) Ratio between coating weights | $SiO_2$ Content % |
| Comparative Example 1 | 50 | — | 50 | — | — | — | — | 0.30 | — | 0.001 | 0.002 | — | — | — | — | 99.7 |
| Comparative Example 2 | 50 | — | 50 | — | — | — | — | 0.30 | — | 0.002 | 0.004 | — | — | — | — | 99.5 |
| Example 1 | 50 | — | 50 | — | — | — | — | 0.30 | — | 0.004 | 0.010 | — | — | — | — | 98.7 |
| Example 2 | 50 | — | 50 | — | — | — | — | 0.30 | — | 0.008 | 0.019 | — | — | — | — | 97.5 |
| Example 3 | 50 | — | 50 | — | — | — | — | 0.30 | — | 0.019 | 0.048 | — | — | — | — | 94.0 |
| Example 4 | 50 | — | 50 | — | — | — | — | 0.30 | — | 0.039 | 0.097 | — | — | — | — | 88.5 |
| Example 5 | 50 | — | 50 | — | — | — | — | 0.30 | — | 0.126 | 0.314 | — | — | — | — | 70.5 |
| Example 6 | 50 | — | 50 | — | — | — | — | 0.30 | — | 0.204 | 0.509 | — | — | — | — | 59.6 |
| Example 7 | 50 | — | 50 | — | — | — | — | 0.30 | — | 0.249 | 0.623 | — | — | — | — | 54.6 |
| Comparative Example 3 | 50 | — | 50 | — | — | — | — | 0.30 | — | 0.326 | 0.814 | — | — | — | — | 48.0 |
| Comparative Example 4 | 50 | — | 50 | — | — | — | — | 0.30 | — | 0.417 | 1.043 | — | — | — | — | 41.8 |
| Example 8 | 50 | — | — | 50 | — | — | — | 0.30 | — | 0.041 | 0.103 | — | — | — | — | 87.9 |
| Example 9 | — | 50 | — | — | 50 | — | — | 0.30 | — | 0.039 | 0.097 | — | — | — | — | 88.5 |
| Example 10 | 50 | — | — | — | — | 50 | — | 0.30 | — | 0.048 | 0.121 | — | — | — | — | 86.1 |
| Example 11 | 50 | — | — | — | — | — | 50 | 0.30 | — | 0.034 | 0.086 | — | — | — | — | 89.7 |
| Example 12 | — | — | — | — | 50 | — | 50 | 0.30 | — | 0.038 | 0.095 | — | — | — | — | 88.8 |
| Example 13 | — | — | — | — | — | 50 | 50 | 0.30 | — | 0.038 | 0.095 | — | — | — | — | 88.8 |
| Example 14 | 60 | — | — | — | 30 | 10 | — | 0.30 | — | 0.046 | 0.116 | — | — | — | — | 86.6 |
| Example 15 | 60 | — | — | — | 15 | 25 | — | 0.30 | — | 0.032 | 0.081 | — | — | — | — | 90.3 |

TABLE 1-continued

| | | | | | | | | | | | | | | | | |
|---|---|---|---|---|---|---|---|---|---|---|---|---|---|---|---|---|
| Example 16 | 30 | — | 30 | — | 20 | 20 | — | 0.30 | — | 0.039 | 0.097 | — | — | — | — | 88.5 |
| Example 17 | 15 | — | 15 | — | 30 | 20 | 20 | 0.30 | — | 0.039 | 0.098 | — | — | — | — | 88.4 |
| Example 18 | 50 | — | 50 | — | — | — | — | 0.30 | F1 | 0.085 | 0.213 | — | — | — | — | 77.9 |
| Example 19 | 50 | — | 50 | — | — | — | — | 0.30 | F2 | 0.062 | 0.156 | — | — | — | — | 82.8 |
| Example 20 | 50 | — | 50 | — | — | — | — | 0.30 | — | 0.053 | 0.132 | R1 | 0.1 | — | — | 78.4 |
| Example 21 | 50 | — | 50 | — | — | — | — | 0.30 | — | 0.056 | 0.141 | R2 | 0.5 | — | — | 59.2 |
| Example 22 | 50 | — | 50 | — | — | — | — | 0.30 | — | 0.031 | 0.077 | R3 | 0.7 | — | — | 55.5 |
| Example 23 | 50 | — | 50 | — | — | — | — | 0.05 | — | 0.001 | 0.015 | — | — | — | — | 98.0 |
| Example 24 | 50 | — | 50 | — | — | — | — | 0.10 | — | 0.007 | 0.052 | — | — | — | — | 93.5 |
| Example 25 | 50 | — | 50 | — | — | — | — | 0.50 | — | 0.143 | 0.214 | — | — | — | — | 77.8 |
| Example 26 | 50 | — | 50 | — | — | — | — | 1.00 | — | 0.615 | 0.461 | — | — | — | — | 61.9 |
| Example 27 | 100 | — | — | — | — | — | — | 0.30 | — | 0.055 | 0.137 | — | — | — | — | 84.6 |
| Example 28 | — | — | 100 | — | — | — | — | 0.30 | — | 0.011 | 0.027 | — | — | — | — | 96.5 |
| Example 29 | — | — | — | — | 100 | — | — | 0.30 | — | 0.065 | 0.162 | — | — | — | — | 82.2 |
| Example 30 | — | — | — | — | — | 100 | — | 0.30 | — | 0.088 | 0.221 | — | — | — | — | 77.2 |
| Example 31 | 15 | — | 50 | — | — | — | — | 0.30 | — | 0.054 | 0.135 | — | — | — | — | 84.7 |
| Example 32 | 50 | — | 15 | — | — | — | — | 0.30 | — | 0.084 | 0.210 | — | — | — | — | 78.1 |
| Example 33 | 15 | — | — | — | 50 | — | — | 0.30 | — | 0.024 | 0.059 | — | — | — | — | 92.7 |
| Example 34 | 100 | — | — | — | 5 | — | — | 0.30 | — | 0.121 | 0.303 | — | — | — | — | 71.2 |
| Example 35 | 25 | — | 25 | — | — | — | 100 | 0.30 | — | 0.069 | 0.173 | — | — | — | — | 81.3 |
| Example 36 | 60 | — | — | — | 30 | 10 | — | 0.30 | — | 0.046 | 0.116 | — | — | L1 | 0.1 | 86.6 |
| Example 37 | 15 | — | 15 | — | 30 | 20 | 20 | 0.30 | — | 0.039 | 0.098 | — | — | L2 | 0.3 | 88.4 |
| Example 38 | 50 | — | 50 | — | — | — | — | 0.30 | — | 0.034 | 0.086 | R1 | 0.5 | L1 | 0.3 | 52.5 |

| pH of treatment solution | Time elapsed after application until baking Seconds | Baking temperature ° C. | Baking time Seconds | Coating properties | | |
|---|---|---|---|---|---|---|
| | | | | Punchability | Adhesion property | |
| | | | | Product sheet | Product sheet | Annealed sheet |
| 5.8 | 3 | 250 | 30 | — | D | C |
| 6.1 | 5 | 250 | 30 | — | C | C |
| 5.9 | 7 | 250 | 30 | — | B | B |
| 5.7 | 10 | 250 | 30 | — | A | B |
| 6.3 | 12 | 250 | 30 | — | A | B |
| 5.6 | 15 | 250 | 30 | B | A | B |
| 5.9 | 20 | 250 | 30 | — | A | B |
| 6.3 | 30 | 250 | 30 | — | A | B |
| 5.8 | 40 | 250 | 30 | — | B | B |
| 6.0 | 60 | 250 | 30 | — | C | C |
| 5.6 | 90 | 250 | 30 | — | D | D |
| 4.5 | 15 | 250 | 30 | — | A | B |
| 5.1 | 15 | 250 | 30 | — | A | B |
| 6.8 | 15 | 250 | 30 | — | A | B |
| 5.2 | 15 | 250 | 30 | — | A | B |
| 5.3 | 15 | 250 | 30 | — | A | B |
| 6.7 | 15 | 250 | 30 | — | B | B |
| 5.2 | 15 | 250 | 30 | — | A | B |
| 6.4 | 15 | 250 | 30 | — | A | B |
| 5.6 | 15 | 250 | 30 | — | A | B |
| 4.2 | 15 | 250 | 30 | — | A | B |
| 5.7 | 15 | 250 | 30 | — | A | B |
| 5.4 | 15 | 250 | 30 | — | A | B |
| 5.8 | 15 | 250 | 30 | A | A | B |
| 6.5 | 15 | 250 | 30 | A | A | B |
| 5.7 | 15 | 250 | 30 | A | A | B |
| 6.1 | 15 | 250 | 30 | — | A | B |

TABLE 1-continued

| | | | | | | |
|---|---|---|---|---|---|---|
| 6.3 | 15 | 250 | 30 | — | A | B |
| 5.7 | 15 | 250 | 30 | — | A | B |
| 5.9 | 15 | 250 | 30 | — | A | B |
| 6.0 | 15 | 250 | 30 | — | A | B |
| 8.1 | 15 | 250 | 30 | — | A | B |
| 5.9 | 15 | 250 | 30 | — | A | B |
| 6.2 | 15 | 250 | 30 | — | B | B |
| 5.8 | 15 | 250 | 30 | — | A | B |
| 4.9 | 15 | 250 | 30 | — | A | B |
| 6.2 | 15 | 250 | 30 | — | A | B |
| 4.1 | 15 | 250 | 30 | — | A | B |
| 5.3 | 15 | 250 | 30 | — | B | B |
| 5.2 | 15 | 250 | 30 | A | A | B |
| 4.2 | 15 | 250 | 30 | A | A | B |
| 5.7 | 15 | 250 | 30 | A | A | B |

TABLE 2

| Symbol | Name | Category | Trademark |
|---|---|---|---|
| S1 | 3-Glycidoxypropyltrimethoxysilane | Alkoxysilane | KBM-403 |
| S2 | 3-Glycidoxypropylmethyldimethoxysilane | Alkoxysilane | KBM-402 |
| S3 | 3-Aminopropyltrimethoxysilane | Alkoxysilane | KBM-903 |
| S4 | N-2-(aminoethyl)-3-aminopropyltrimethoxysilane | Alkoxysilane | KBM-603 |
| S5 | Methyltriethoxysilane | Alkoxysilane | KBE-13 |
| S6 | Colloidal silica | — | SNOWTEX ® O |
| S7 | Fumed silica | — | AEROSIL ® 200 |

TABLE 3

| Symbol | Name | Maker | Trademark |
|---|---|---|---|
| R1 | Polyester resin | Toyobo | VYLONAL ® MD1200 |
| R2 | Acrylic resin | DIC | Voncoat ® CP6140 |
| R3 | Urethane resin | ADEKA | ADEKA BONTIGHTER ® HUX |

TABLE 4

| Symbol | Name | Maker | Trademark |
|---|---|---|---|
| F1 | FeOOH | — | — |
| F2 | Fe2O3 | — | — |

TABLE 5

| Symbol | Name | Maker | Trademark |
|---|---|---|---|
| L1 | Polyethylene wax | Mitsui Chemicals | HI-WAX ® 400P |
| L2 | PTFE wax | Du Pont | nanoFLON PTFE AQ-60 |

The invention claimed is:

1. An insulated electrical steel sheet consisting of:

an electrical steel sheet; and an insulating coating formed on the electrical steel sheet by a method comprising:

preparing a treatment solution that does not contain an Fe compound by adding an Si compound to water;

applying the treatment solution to a surface of the electrical steel sheet;

leaving the treatment solution on the surface of the electrical steel sheet to allow Fe in the electrical steel sheet to be dissolved in the treatment solution; and baking the treatment solution to form the insulating coating such that a coating weight of Si in the insulating coating in terms of $SiO_2$ is 50% to 99% of the total coating weight, and a ratio (Fe/Si) of content of Fe to content of Si in the insulating coating is 0.01 to 0.6 on a molar basis.

2. The electrical steel sheet according to claim 1, wherein the Si compound contains a reactive functional group.

3. The electrical steel sheet according to claim 1, wherein the Si compound contains an alkoxy group bonded to a silicon atom.

4. The electrical steel sheet according to claim 1, wherein the Si compound is methyltriethoxysilane.

5. The electrical steel sheet according to claim 1, wherein the preparing of the treatment solution includes adjusting a pH of the treatment solution to 3 to 12.

6. The electrical steel sheet according to claim 1, wherein the preparing of the treatment solution includes adjusting a pH of the treatment solution to 4.2 to 6.5.

7. The electrical steel sheet according to claim 1, wherein the treatment solution is left on the surface of the electrical steel sheet for 3 seconds to 220 seconds before the baking.

8. The electrical steel sheet according to claim 1, wherein the treatment solution is left on the surface of the electrical steel sheet for 10 seconds to 100 seconds before the baking.

9. The electrical steel sheet according to claim 1, wherein the treatment solution is left on the surface of the electrical steel sheet for 10 seconds to 40 seconds before the baking.

10. An insulated electrical steel sheet consisting of:

an electrical steel sheet; and an insulating coating formed on the electrical steel sheet by a method comprising:

preparing a treatment solution that does not contain an Fe compound by adding an Si compound that contains a reactive functional group to water;

applying the treatment solution to a surface of the electrical steel sheet;

leaving the treatment solution on the surface of the electrical steel sheet to allow Fe in the electrical steel sheet to be dissolved in the treatment solution; and baking the treatment solution to form the insulating coating such that a coating weight of Si in the insulating coating in terms of $SiO_2$ is 50% to 99% of the total coating weight, and a ratio (Fe/Si) of content of Fe to content of Si in the insulating coating is 0.01 to 0.6 on a molar basis.

11. The electrical steel sheet according to claim 10, wherein the reactive functional group is an alkoxy group bonded to a silicon atom.

12. The electrical steel sheet according to claim 10, wherein the Si compound that contains the reactive functional group is methyltriethoxysilane.

13. The electrical steel sheet according to claim 10, wherein the preparing of the treatment solution includes adjusting a pH of the treatment solution to 3 to 12.

14. The electrical steel sheet according to claim 10, wherein the preparing of the treatment solution includes adjusting a pH of the treatment solution to 4.2 to 6.5.

15. The electrical steel sheet according to claim 10, wherein the treatment solution is left on the surface of the electrical steel sheet for 3 seconds to 220 seconds before the baking.

16. The electrical steel sheet according to claim 10, wherein the treatment solution is left on the surface of the electrical steel sheet for 10 seconds to 100 seconds before the baking.

17. The electrical steel sheet according to claim 10, wherein the treatment solution is left on the surface of the electrical steel sheet for 10 seconds to 40 seconds before the baking.

* * * * *